(12) United States Patent
Kruiskamp

(10) Patent No.: US 10,084,375 B2
(45) Date of Patent: Sep. 25, 2018

(54) CHARGE PUMP SUITABLE FOR LOW INPUT VOLTAGES

(71) Applicant: Dialog Semiconductor B.V., 's-Hertogenbosch (NL)

(72) Inventor: Marinus Wilhelmus Kruiskamp, 's-Hertogenbosch (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 15/360,041

(22) Filed: Nov. 23, 2016

(65) Prior Publication Data
US 2017/0149331 A1    May 25, 2017

(30) Foreign Application Priority Data
Nov. 25, 2015   (DE) .................. 10 2015 223 336

(51) Int. Cl.
*H02M 3/07*    (2006.01)
(52) U.S. Cl.
CPC ...... *H02M 3/073* (2013.01); *H02M 2003/077* (2013.01)
(58) Field of Classification Search
CPC ............................... H02M 3/07; H02M 3/073
USPC ....................................................... 327/536
See application file for complete search history.

(56) References Cited

U.S. PATENT DOCUMENTS

| | | | | |
|---|---|---|---|---|
| 5,436,587 A * | 7/1995 | Cernea | ................... | G11C 5/145 307/110 |
| 6,278,315 B1 * | 8/2001 | Kim | ................... | G11C 5/145 327/536 |
| 6,501,325 B1 * | 12/2002 | Meng | ................... | H02M 3/073 327/536 |
| 6,734,717 B2 * | 5/2004 | Min | ................... | H02M 3/073 327/536 |
| 7,145,382 B2 * | 12/2006 | Ker | ................... | H02M 3/073 327/536 |
| 8,076,968 B1 | 12/2011 | Floyd | | |
| 8,125,263 B2 * | 2/2012 | Wu | ................... | H02M 3/073 327/536 |

(Continued)

OTHER PUBLICATIONS

German Office Action, File No. 10 2015 223 336.7, Applicant: Dialog Semiconductor B.V., dated Mar. 31, 2016, 14 pgs and English language translation, 16 pgs.

(Continued)

*Primary Examiner* — William Hernandez
(74) *Attorney, Agent, or Firm* — Saile Ackerman LLC; Stephen B. Ackerman

(57) ABSTRACT

A charge pump circuit suitable for low input voltages is presented. The charge pump circuit has a first clock signal generator, a second clock signal generator, and n voltage doubler circuits. The voltage doubler has an input, an output, a first capacitor connected to the first clock signal generator, a second capacitor connected to the second clock signal generator, a first NMOST having the source connected to the input and the drain connected to the first capacitor, a second NMOST having the connected to the source of the first NMOST and the drain connected to second capacitor, a first PMOST having the drain connected to the first capacitor and the source connected to the output, a second PMOST having the source connected to the source of the first PMOST and the drain connected to the second capacitor.

11 Claims, 7 Drawing Sheets

(56) References Cited

U.S. PATENT DOCUMENTS

| | | | |
|---|---|---|---|
| 9,882,471 B2* | 1/2018 | Giuliano | H02M 3/07 |
| 2005/0093614 A1* | 5/2005 | Lee | H02M 3/073 |
| | | | 327/536 |
| 2007/0109035 A1 | 5/2007 | Tsivyan | |
| 2009/0237149 A1 | 9/2009 | Ueda | |
| 2012/0169409 A1 | 7/2012 | Ker et al. | |
| 2013/0051583 A1 | 2/2013 | Gueorguiev | |
| 2015/0288353 A1* | 10/2015 | Kalluru | H03K 5/023 |
| | | | 365/185.12 |

OTHER PUBLICATIONS

"An Experimental 1.5-V 64Mb DRAM," by Yoshinobu Nakagome et al., IEEE Journal of Solid-State Circuits, vol. 26, No. 4, Apr. 1991, pp. 465-472.

* cited by examiner

US 10,084,375 B2

CHARGE PUMP SUITABLE FOR LOW INPUT VOLTAGES

TECHNICAL FIELD

The invention relates to voltage doubler circuits, and in particular, to charge pumps circuits implemented with voltage doubler circuits.

BACKGROUND

A thermoelectric generator (TEG) converts body heat into electricity to supply power to sensors. However, the output voltage of a TEG is usually very low (often a few hundred millivolt or less). Therefore, a TEG requires a low-voltage high-efficiency voltage converter.

Usually, this is achieved by using an inductive direct current-to-direct current (DC-DC) converter, supported by a start-up circuit. The start-up circuit must be able to start-up by itself and generate a sufficiently high voltage for the control circuits of the inductive DC-DC converter to operate. This start-up circuit is very often a capacitive charge-pump circuit. An alternative method would be to omit the inductive DC-DC converter and to perform all the power transfer by using the capacitive charge-pump circuit, and not only during start-up.

"An experimental 1.5V 64 Mb DRAM" by Y. Nakagome, H. Tanaka, et al., IEEE J. Solid-State Circuits, vol. 26, no. 4, pp. 465-472, April 1991 describes a basic voltage-doubler as used in many charge pump circuits.

FIG. 1 illustrates a known charge pump circuit implemented using voltage doubler circuits. The charge-pump circuit 10 of FIG. 1, seen from down to up, comprises a series circuit of first voltage doubler circuit 1, a second voltage doubler circuit 2, and a third voltage doubler circuit 3.

The charge pump circuit 10 of FIG. 1 comprises a plurality of transistors $T_i$ (i=1, 2, . . . , 12). Each one of these transistors $T_i$ has a respective gate $G_i$, a source $S_i$, and a drain $D_i$. For the sake of simplicity, a transistor $T_i$ will be called an $i^{th}$ transistor in the specification hereinafter. The charge pump circuit 10 of FIG. 1 also comprises a plurality of capacitors $C_j$ (j=1, 2, . . . , 6). Each one of these capacitors $C_j$ has a first end $c_{j1}$ and a second end $c_{j2}$. It is observed that the reference number concerned may be different in the claims, as they may appear in another order in the claims.

FIG. 1, also shows the voltage received and delivered by each of the voltage doubler circuits: the first voltage doubler circuit 1 is arranged to receive a voltage $V_{in1}$ from the input $V_{in}$ of the charge pump circuit 10 and to deliver a voltage $V_{out1}$ to the second voltage doubler circuit 2, the second voltage doubler circuit 2 is arranged to receive a voltage $V_{in2}$ and to deliver a voltage $V_{out2}$ to the third voltage doubler circuit 3, and the third voltage doubler circuit 3 is arranged to receive a voltage $V_{in3}$ and to deliver a voltage $V_{out3}$ to the output $V_{out}$ of the charge pump circuit 10 of FIG. 1.

The charge pump circuit 10 of FIG. 1 comprises a first clock signal generator $CLK_p$ and a second clock signal generator $CLK_n$. The first clock signal generator $CLK_p$ is configured to generate a first clock signal and the a second clock signal generator $CLK_n$ is configured to generate a second clock signal, wherein the second clock signal is low when the first clock signal is high and the second clock signal is high when the first clock signal is low.

The charge pump circuit 10 of FIG. 1 comprises a capacitor $C_{out}$ having a first end $c_{out1}$ and a second end $c_{out2}$. The first end $c_{out1}$ of $C_{out}$ is connected to the output $V_{out}$ of the charge pump circuit 10 of FIG. 1. The second end $c_{out2}$ of $C_{out}$ is connected to the ground.

The first voltage doubler circuit of the charge pump circuit 10 of FIG. 1 includes a first N-type metal oxide semiconductor transistor (NMOST) $T_1$, a second N-type metal oxide semiconductor transistor $T_2$, a third P-type metal oxide semiconductor transistor (PMOST) $T_3$, and a fourth P-type metal oxide semiconductor transistor $T_4$. The first voltage doubler circuit of the charge pump circuit 10 of FIG. 1 also includes a first capacitor $C_1$ having a first end $c_{11}$ and a second end $c_{12}$ and a second capacitor $C_2$ having a first end $c_{21}$ and a second end $c_{22}$. The first NMOST $T_1$ and the second NMOST $T_2$ have their source terminals $S_1$ and $S_2$ connected to the input $V_{in}$ of the charge pump circuit and their drain terminals $D_1$ and $D_2$ are connected respectively to the second end $c_{12}$ of capacitor $C_1$ and to the first end $c_{21}$ of capacitor $C_2$. The drain terminal $D_1$ of the first NMOST $T_1$ is also connected to the drain terminal $D_3$ of the third PMOST $T_3$, to the gate terminal $G_4$ of fourth PMOST $T_4$ and to the gate terminal $G_2$ of second NMOST $T_2$. The drain terminal $D_2$ of the second NMOST $T_2$ is also connected to the drain terminal $D_4$ of the fourth PMOST $T_4$, to the gate terminal $G_3$ of third PMOST $T_3$ and to the gate terminal $G_1$ of first NMOST $T_1$. The third PMOST $T_3$ and the fourth PMOST $T_4$ have their source terminals $S_3$ and $S_4$ connected to the output of the first double voltage circuit.

The output $V_{out1}$ of the first double voltage circuit 1 of the charge pump circuit 10 of FIG. 1 is connected to the input of the second voltage doubler circuit of the charge pump circuit.

The second voltage doubler circuit of the charge pump circuit 10 of FIG. 1 includes a fifth NMOST $T_5$, a sixth NMOST $T_6$, a seventh PMOST $T_7$, and an eighth PMOST $T_8$. The second voltage doubler circuit of the charge pump circuit 10 of FIG. 1 also includes a third capacitor $C_3$ having a first end $c_{31}$ and a second end $c_{32}$ and a fourth capacitor $C_4$ having a first end $c_{41}$ and a second end $c_{42}$. The fifth NMOST $T_5$ and the sixth NMOST $T_6$ have their source terminals $S_5$ and $S_6$ connected to the input $V_{in2}$ of the second voltage doubler circuit 2 of the charge pump circuit 10 of FIG. 1, and their drain terminals $D_5$ and $D_6$ connected respectively to the second end $c_{32}$ of capacitor $C_3$ and to the first end $c_{41}$ of capacitor $C_4$. The drain terminal $D_5$ of the fifth NMOST $T_5$ is also connected to the drain terminal $D_7$ of the seventh PMOST $T_7$, to the gate terminal $G_8$ of eighth PMOST $T_8$ and to the gate terminal $G_6$ of sixth NMOST $T_6$. The drain terminal $D_6$ of the sixth NMOST $T_6$ is also connected to the drain terminal $D_8$ of the eighth PMOST $T_8$, to the gate terminal $G_7$ of seventh PMOST $T_7$ and to the gate terminal $G_5$ of fifth NMOST $T_5$. The seventh PMOST $T_7$ and the eighth PMOST $T_8$ have their source terminals $S_7$ and $S_8$ connected to the output $V_{out2}$ of the second double voltage circuit 2.

The output $V_{out2}$ of the second double voltage circuit 2 of the charge pump circuit 10 of FIG. 1 is connected to the input $V_{in3}$ of the third voltage doubler circuit 3 of the charge pump circuit 10.

The third voltage doubler circuit 3 of the charge pump circuit 10 of FIG. 1 includes a ninth NMOST $T_9$, a tenth NMOST $T_{10}$, a eleventh PMOST $T_{11}$, and a twelfth PMOST $T_{12}$. The third voltage doubler circuit of the charge pump circuit 10 of FIG. 1 also includes a fifth capacitor $C_5$ having a first end $c_{51}$ and a second end $c_{52}$ and a sixth capacitor $C_6$ having a first end $c_{61}$ and a second end $c_{62}$. The ninth NMOST $T_9$ and the tenth NMOST $T_{10}$ have their source terminals $S_9$ and $S_{10}$ connected to the input of the third voltage doubler circuit of the charge pump circuit 10 of FIG.

1, and their drain terminals $D_9$ and $D_{10}$ connected respectively to the second end $c_{52}$ of capacitor $C_5$ and to the first end $c_{61}$ of capacitor $C_6$. The drain terminal $D_9$ of the ninth NMOST $T_9$ is also connected to the drain terminal $D_{11}$ of the eleventh PMOST $T_{11}$, to the gate terminal $G_{12}$ of twelfth PMOST $T_{12}$ and to the gate terminal $G_{10}$ of tenth NMOST $T_{10}$. The drain terminal $D_{10}$ of the tenth NMOST $T_{10}$ is also connected to the drain terminal $D_{12}$ of the twelfth PMOST $T_{12}$, to the gate terminal $G_{11}$ of eleventh PMOST $T_{11}$ and to the gate terminal $G_9$ of ninth NMOST $T_9$ The eleventh PMOST $T_{11}$ and the twelfth PMOST $T_{12}$ have their source terminals $S_{11}$ and $S_{12}$ connected to the output $V_{out3}$ of the third double voltage circuit 3.

The output $V_{out3}$ of the third double voltage circuit 3 of the charge pump circuit 10 of FIG. 1 is connected to the output $V_{out}$ of the charge pump circuit 10.

The first clock signal generator $CLK_p$ of the charge pump circuit 10 of FIG. 1 is connected to the first end $c_{11}$ of capacitor $C_1$, to the first end $c_{31}$ of capacitor $C_3$, and to the first end $c_{51}$ of capacitor $C_5$. The second clock signal generator $CLK_n$ of the charge pump circuit 10 of FIG. 1 is connected to the second end $c_{22}$ of capacitor $C_2$, to the second end $c_{42}$ of capacitor $C_4$, and to the second end $c_{62}$ of capacitor $C_6$.

Now it will be explained how the charge pump circuit 10 of FIG. 1 works.

The first clock signal generator $CLK_p$ of the charge pump circuit 10 of FIG. 1 oscillates between a low value of zero and a high value of $V_{DD}$. The second clock signal generator $CLK_n$ of the charge pump circuit 10 of FIG. 1 oscillates between a high value of $V_{DD}$ and a low value of zero.

In phase 1, the first clock signal generator $CLK_p$ is low, the second clock signal $CLK_n$ is high, the first NMOST $T_1$ and the fourth transistor PMOST $T_4$ are conducting while the second NMOST $T_2$ and the third transistor PMOST $T_3$ are in cut-off. The capacitor $C_1$ is charging to the input voltage $V_{in1}$. In phase 2, the first clock signal generator $CLK_p$ is high, the second clock signal $CLK_n$ is low, the first NMOST $T_1$ and the fourth transistor PMOST $T_4$ are in cut-off while the second NMOST $T_2$ and the third transistor PMOST $T_3$ are conducting, therefore the charge $V_{in1}$ of the capacitor $C_1$ is transferred partially to the output $V_{out1}$ to keep the output voltage higher than the input voltage $V_{in1}$. The capacitor $C_2$ does the same but in opposite phases, i.e., in phase 1 its charge is transferred partially to the output $V_{out1}$ and in phase 2 the capacitor $C_2$ is charging to the input voltage $V_{in1}$. By cascading several voltage doubling stages, an output voltage $V_{out}$ higher than the input voltage $V_{in}$ can be obtained, as each double voltage circuit provides a higher input voltage to the following double voltage circuit.

In the basic voltage-doubler implemented in FIG. 1, the transistors are turned-on with an absolute gate-source voltage $V_{GS}$ of not more than $V_{in}=V_{DD}$ (assuming that the clock signals are both toggling between 0V and $V_{DD}$, and assuming that the output is equal to twice $V_{in}$, which is the intended operation).

This limited voltage to turn-on the transistors has a negative effect on the drive capability of the circuit and the minimum input voltage $V_{in}$ at which the circuit can operate.

SUMMARY

There is a need to provide an improved charge pump circuit. In a first aspect, the invention provides a charge pump circuit comprising a number n of voltage doubler circuits, with n>1, a first clock signal generator configured to generate a first clock signal, a second clock signal generator configured to generate a second clock signal, wherein the second clock signal is low when the first clock signal is high and the second clock signal is high when the first clock signal is low, wherein each one of the n voltage doubler circuits comprises an input, an output, a first capacitor having a first and a second terminal, wherein the first terminal is connected to the first clock signal generator, a second capacitor having a first and a second terminal, wherein the first terminal is connected to the second clock signal generator, a first N-type metal oxide semiconductor transistor (NMOST) having a source, a drain and a gate, wherein the source of the first NMOST is connected to the input of the voltage doubler circuit and the drain of the first NMOST is connected to the second terminal of the first capacitor, a second N-type metal oxide semiconductor transistor (NMOST) having a source, a drain and a gate, wherein the source of the second NMOST is connected to the source of the first NMOST and the drain of the second NMOST is connected to the second terminal of the second capacitor, a first P-type metal oxide semiconductor transistor (PMOST) having a source, a drain and a gate, wherein the drain of the first PMOST is connected to the second terminal of the first capacitor and the source of the first PMOST is connected to the output of the voltage doubler circuit, a second P-type metal oxide semiconductor transistor (PMOST) having a source, a drain and a gate, wherein the source of the second PMOST is connected to the source of the first PMOST and the drain of the second PMOST is connected to the second terminal of the second capacitor, wherein the output of the i-th voltage doubler circuit is the input of the (i+1)-th voltage doubler circuit for every i from 1 to n−1, wherein at least a k-th voltage doubler circuit of the n voltage doubler circuits has the gate of the first PMOST and/or the gate of the second PMOST connected respectively to the second terminal of the second capacitor and/or to the second terminal of the first capacitor of an m-th voltage doubler circuit, wherein m<k, and/or the gate of the first NMOST and/or the gate of the second NMOST connected respectively to the second terminal of the second capacitor and/or to the second terminal of the first capacitor of a j-th voltage doubler circuit, wherein j>k.

By doing so, the gates of the NMOST switches of a voltage doubler circuit and/or the gates of the PMOS switches of a voltage doubler circuit are driven by a higher voltage doubler circuit and/or by a lower voltage doubler circuit. In this way, a higher $V_{GS}$ can be obtained for switching on the transistors.

Compared to a conventional charge-pump (a cascade of conventional voltage doublers), the on-resistance of the switches is significantly reduced for a given input voltage and transistor size. So either the circuit can be smaller for a similar performance, or it can operate at a lower input voltage or it can deliver a larger load current for a similar size.

The dependent claims are focusing on advantageous embodiments.

The person skilled in the art will understand that the features described above may be combined in any way deemed useful.

BRIEF DESCRIPTION OF THE DRAWINGS

In the following, aspects of the invention will be elucidated by means of examples, with reference to the drawings. The drawings are diagrammatic and may not be drawn to scale.

The features and effects of the present invention will be explained in more detail below with reference to drawings in which preferred and illustrative embodiments of the invention are shown. The person skilled in the art will realize that other alternatives and equivalent embodiments of the invention can be conceived and reduced to practice without departing from the scope of the present invention.

DESCRIPTION

The examples and embodiments described herein serve to illustrate rather than to limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single or multiple hardware items combining the features of the items described.

Figure 2:
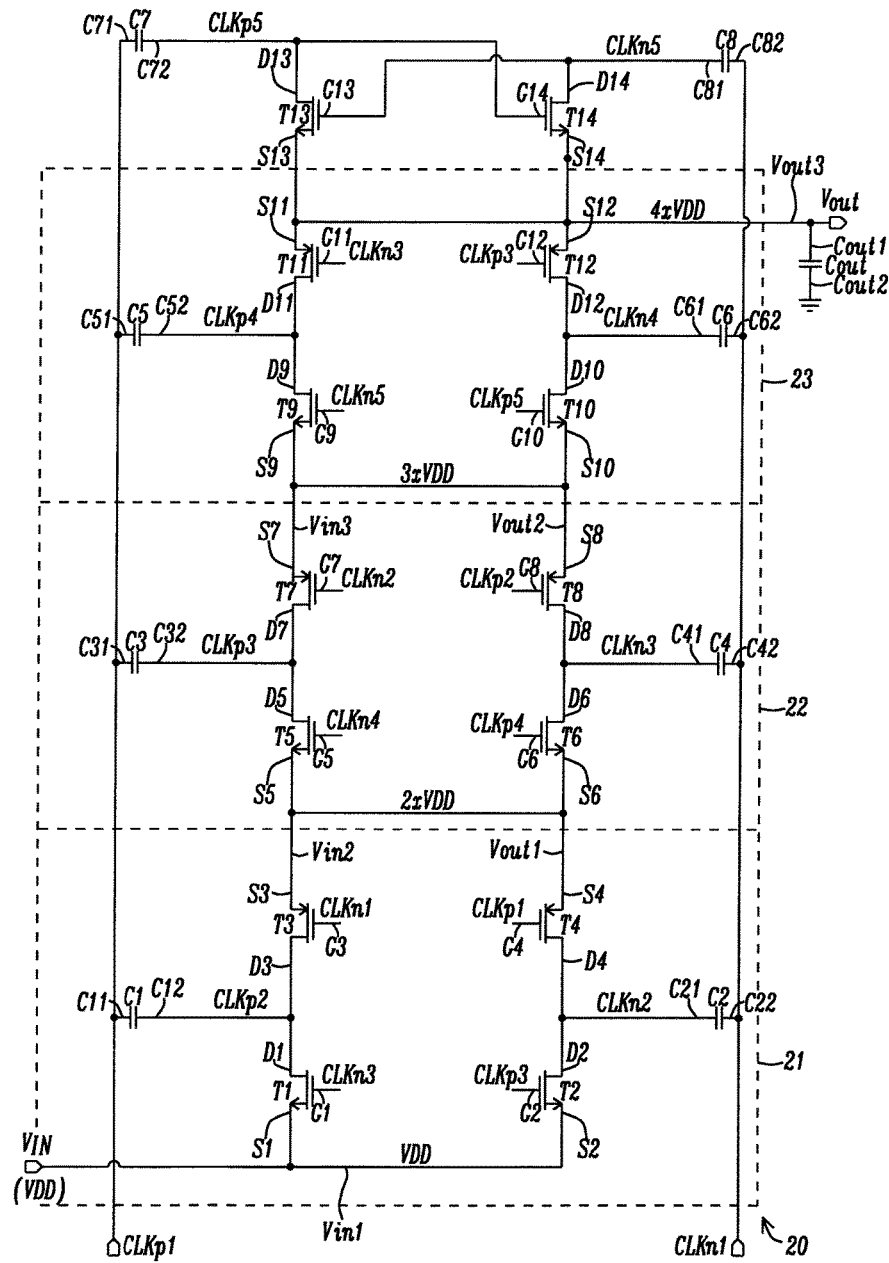
FIG. 2 illustrates a charge pump circuit according to one embodiment of the invention.

FIG. 2 illustrates a charge-pump circuit implemented with voltage doubler circuits. The charge-pump circuit 20 of FIG. 2, seen from down to up, comprises a series circuit of first voltage doubler circuit 21, a second voltage doubler circuit 22, and a third voltage doubler circuit 23. The charge-pump circuit 20 of FIG. 2 may comprise any number of first voltage doubler circuits.

The charge pump circuit 20 of FIG. 2 comprises a plurality of transistors $T_i$ (i=1, 2 . . . 14). Each one of these transistors $T_i$ has a respective gate $G_i$, a source $S_i$, and a drain $D_i$. For the sake of simplicity, a transistor $T_i$ will be called an $i^{th}$ transistor in the specification hereinafter. The charge pump circuit 20 of FIG. 2 also comprises a plurality of capacitors $C_j$ (j=1, 2 . . . 8). Each one of these capacitors $C_j$ has a first end $c_{j1}$ and a second end $c_{j2}$. It is observed that the reference number concerned may be different in the claims, as they may appear in another order in the claims.

FIG. 2, also shows the voltage received and delivered by each of the voltage doubler circuits: the first voltage doubler circuit 21 is arranged to receive a voltage $V_{in1}$ from the input $V_{in}$ of the charge pump circuit and to deliver a voltage $V_{out1}$ to the second voltage doubler circuit 22, the second voltage doubler circuit 22 is arranged to receive a voltage $V_{in2}$ and to deliver a voltage $V_{out2}$ to the third voltage doubler circuit 23, and the third voltage doubler circuit 23 is arranged to receive a voltage $V_{in3}$ and to deliver a voltage $V_{out3}$ to the output $V_{out}$ of the charge pump circuit 20 of FIG. 2.

The charge pump circuit 20 of FIG. 2 comprises a first clock signal generator $CLK_{p1}$ and a second clock signal generator $CLK_{n1}$. The first clock signal generator $CLK_{p1}$ is configured to generate a first clock signal and the a second clock signal generator $CLK_{n1}$ is configured to generate a second clock signal, wherein the second clock signal is low when the first clock signal is high and the second clock signal is high when the first clock signal is low.

The charge pump circuit 20 of FIG. 2 may comprise a capacitor $C_{out}$ having a first end $c_{out1}$ and a second end $c_{out2}$. The first end $c_{out1}$ of $C_{out}$ may be connected to the output $V_{out}$ of the charge pump circuit 20 of FIG. 2. The second end $c_{out2}$ of $C_{out}$ may be connected to the ground.

The first voltage doubler circuit 21 of the charge pump circuit 20 of FIG. 2 includes a first N-type metal oxide semiconductor transistor (NMOST) $T_1$, a second N-type metal oxide semiconductor transistor $T_2$, a third P-type metal oxide semiconductor transistor (PMOST) $T_3$, and a fourth P-type metal oxide semiconductor transistor $T_4$. The first voltage doubler circuit 21 of the charge pump circuit 20 of FIG. 2 also includes a first capacitor $C_1$ having a first end $c_{11}$ and a second end $c_{12}$ and a second capacitor $C_2$ having a first end $c_{21}$ and a second end $c_{22}$. The first NMOST $T_1$ and the second NMOST $T_2$ have their source terminals $S_1$ and $S_2$ connected to the input $V_{in}$ of the charge pump circuit 20 of FIG. 2 and their drain terminals $D_1$ and $D_2$ connected respectively to the second end $c_{12}$ of capacitor $C_1$ and to the first end $c_{21}$ of capacitor $C_2$. The drain terminal $D_1$ of the first NMOST $T_1$ is also connected to the drain terminal $D_3$ of the third PMOST $T_3$. The drain terminal $D_2$ of the second NMOST $T_2$ is also connected to the drain terminal $D_4$ of the fourth PMOST $T_4$. The third PMOST $T_3$ and the fourth PMOST $T_4$ have their source terminals $S_3$ and $S_4$ connected to the voltage output $V_{out1}$ of the first double voltage circuit 21.

The voltage output $V_{out1}$ of the first double voltage circuit 21 of the charge pump circuit 20 of FIG. 2 is connected to the voltage input $V_{in2}$ of the second voltage doubler circuit 22 of the charge pump circuit 20.

The second voltage doubler circuit 22 of the charge pump circuit 20 of FIG. 2 includes a fifth NMOST $T_5$, a sixth NMOST $T_6$, a seventh PMOST $T_7$, and an eighth PMOST $T_8$. The second voltage doubler circuit 22 of the charge pump circuit 20 of FIG. 2 also includes a third capacitor $C_3$ having a first end $c_{31}$ and a second end $c_{32}$ and a fourth capacitor $C_4$ having a first end $c_{41}$ and a second end $c_{42}$. The fifth NMOST $T_5$ and the sixth NMOST $T_6$ have their source terminals $S_5$ and $S_6$ connected to the input $V_{in2}$ of the second voltage doubler circuit 22 of the charge pump circuit 20 of FIG. 2, and their drain terminals $D_5$ and $D_6$ connected respectively to the second end $c_{32}$ of capacitor $C_3$ and to the first end $c_{41}$ of capacitor $C_4$. The drain terminal $D_5$ of the fifth NMOST $T_5$ is also connected to the drain terminal $D_7$ of the seventh PMOST $T_7$ The drain terminal $D_6$ of the sixth NMOST $T_6$ is also connected to the drain terminal $D_8$ of the eighth PMOST $T_8$. The seventh PMOST $T_7$ and the eighth PMOST $T_8$ have their source terminals $S_7$ and $S_8$ connected to the output $V_{out2}$ of the second double voltage circuit 22.

The output $V_{out2}$ of the second double voltage circuit 22 of the charge pump circuit 20 of FIG. 2 is connected to the input $V_{in3}$ of the third voltage doubler circuit 23 of the charge pump circuit 20.

The third voltage doubler circuit 23 of the charge pump circuit 20 of FIG. 2 includes a ninth NMOST $T_9$, a tenth NMOST $T_{10}$, a eleventh PMOST $T_{11}$, and a twelfth PMOST $T_{12}$. The third voltage doubler circuit 23 of the charge pump circuit 20 of FIG. 2 also includes a fifth capacitor $C_5$ having a first end $c_{51}$ and a second end $c_{52}$ and a sixth capacitor $C_6$ having a first end $c_{61}$ and a second end $c_{62}$. The ninth NMOST $T_9$ and the tenth NMOST $T_{10}$ have their source terminals $S_9$ and $S_{10}$ connected to the input $V_{in3}$ of the third voltage doubler circuit 23 of the charge pump circuit 20 of FIG. 2, and their drain terminals $D_9$ and $D_{10}$ connected respectively to the second end $c_{52}$ of capacitor $C_5$ and to the first end $c_{61}$ of capacitor $C_6$. The drain terminal $D_9$ of the ninth NMOST $T_9$ is also connected to the drain terminal $D_{11}$ of the eleventh PMOST $T_{11}$. The drain terminal $D_{10}$ of the tenth NMOST $T_{10}$ is also connected to the drain terminal $D_{12}$ of the twelfth PMOST $T_{12}$. The eleventh PMOST $T_{11}$ and the twelfth PMOST $T_{12}$ have their source terminals $S_{11}$ and $S_{12}$ connected to the output $V_{out3}$ of the third double voltage circuit 23.

The output $V_{out3}$ of the third double voltage circuit 23 of the charge pump circuit 20 of FIG. 2 is connected to the output $V_{out}$ of the charge pump circuit 20.

The charge pump circuit 20 of FIG. 2 includes a thirteenth NMOST $T_{13}$, a fourteenth NMOST $T_{14}$, a seventh capacitor $C_7$ having a first end $c_{71}$ and a second end $c_{72}$, and a eighth capacitor $C_8$ having a first end $c_{81}$ and a second end $c_{82}$.

The source terminal $S_{13}$ of the thirteenth NMOST $T_{13}$ and the source terminal $S_{14}$ of the fourteenth NMOST $T_{14}$ are connected to the output of the third double voltage circuit 23 of the charge pump circuit 20 of FIG. 2.

The drain terminal $D_{13}$ of the thirteenth NMOST $T_{13}$ and the drain terminal $D_{14}$ of the fourteenth NMOST $T_{14}$ connected respectively to the second end $c_{72}$ of capacitor $C_7$ and to the first end $c_{81}$ of capacitor $C_8$. The drain terminal $D_{13}$ of the thirteenth NMOST $T_{13}$ is also connected to the gate terminal $G_{14}$ of the fourteenth NMOST $T_{14}$. The drain terminal $D_{14}$ of the fourteenth NMOST $T_{14}$ is also connected to the gate terminal $G_{13}$ of the thirteenth NMOST $T_{13}$.

The first clock signal generator $CLK_{p1}$ of the charge pump circuit 20 of FIG. 2 is connected to the first end $c_{11}$ of capacitor $C_1$, to the first end $c_{31}$ of capacitor $C_3$, to the first end $c_{51}$ of capacitor $C_5$, and to the first end $c_{71}$ of capacitor $C_7$. The second clock signal generator $CLK_{n1}$ of the charge pump circuit 20 of FIG. 2 is connected to the second end $c_{22}$ of capacitor $C_2$, to the second end $c_{42}$ of capacitor $C_4$, and to the second end $c_{62}$ of capacitor $C_6$, and to the second end $c_{82}$ of capacitor $C_8$.

The first NMOST $T_1$ of the first double voltage circuit 21 of the charge pump circuit 20 of FIG. 2 has its gate terminal $G_1$ connected to the first end $c_{41}$ of capacitor $C_4$ of the second double voltage circuit 22 of the charge pump circuit 20 of FIG. 2.

The second NMOST $T_2$ of the first double voltage circuit 21 of the charge pump circuit 20 of FIG. 2 has its gate terminal $G_2$ connected to the second end $c_{32}$ of capacitor $C_3$ of the second double voltage circuit 22 of the charge pump circuit 20 of FIG. 2.

The third PMOST $T_3$ of the first double voltage circuit 21 of the charge pump circuit 20 of FIG. 2 has its gate terminal $G_3$ connected to the second clock signal generator $CLK_{n1}$ of the charge pump circuit 20 of FIG. 2.

The fourth PMOST $T_4$ of the first double voltage circuit 21 of the charge pump circuit 20 of FIG. 2 has its gate terminal $G_4$ connected to the first clock signal generator $CLK_{p1}$ of the charge pump circuit 20 of FIG. 2.

The fifth NMOST $T_5$ of the second double voltage circuit 22 of the charge pump circuit 20 of FIG. 2 has its gate terminal $G_5$ connected to the first end $c_{61}$ of capacitor $C_6$ of the third double voltage circuit 23 of the charge pump circuit 20 of FIG. 2.

The sixth NMOST $T_6$ of the second double voltage circuit 22 of the charge pump circuit 20 of FIG. 2 has its gate terminal $G_6$ connected to the second end $c_{52}$ of capacitor $C_5$ of the third double voltage circuit 23 of the charge pump circuit 20 of FIG. 2.

The seventh PMOST $T_7$ of the second double voltage circuit 22 of the charge pump circuit 20 of FIG. 2 has its gate terminal $G_7$ connected to the first end $c_{21}$ of capacitor $C_2$ of the first double voltage circuit 21 of the charge pump circuit 20 of FIG. 2.

The eighth PMOST $T_8$ of the second double voltage circuit 22 of the charge pump circuit 20 of FIG. 2 has its gate terminal $G_8$ connected to the second end $c_{12}$ of capacitor $C_1$ of the first double voltage circuit 21 the charge pump circuit 20 of FIG. 2.

The ninth NMOST $T_9$ of the third double voltage circuit 23 of the charge pump circuit 20 of FIG. 2 has its gate terminal $G_9$ connected to the first end $c_{81}$ of capacitor $C_8$ of the charge pump circuit 20 of FIG. 2.

The tenth NMOST $T_{10}$ of the third double voltage circuit 23 of the charge pump circuit 20 of FIG. 2 has its gate terminal $G_{10}$ connected to the second end $c_{72}$ of capacitor $C_7$ of the charge pump circuit 20 of FIG. 2.

The eleventh PMOST $T_{11}$ of the third double voltage circuit 23 of the charge pump circuit 20 of FIG. 2 has its gate terminal $G_{11}$ connected to the first end $c_{41}$ of capacitor $C_4$ of the second double voltage circuit 22 of the charge pump circuit 20 of FIG. 2.

The twelfth PMOST $T_{12}$ of the third double voltage circuit 23 of the charge pump circuit 20 of FIG. 2 has its gate terminal $G_{12}$ connected to the second end $c_{32}$ of capacitor $C_3$ of the second double voltage circuit 22 of the charge pump circuit 20 of FIG. 2.

Figure 1:
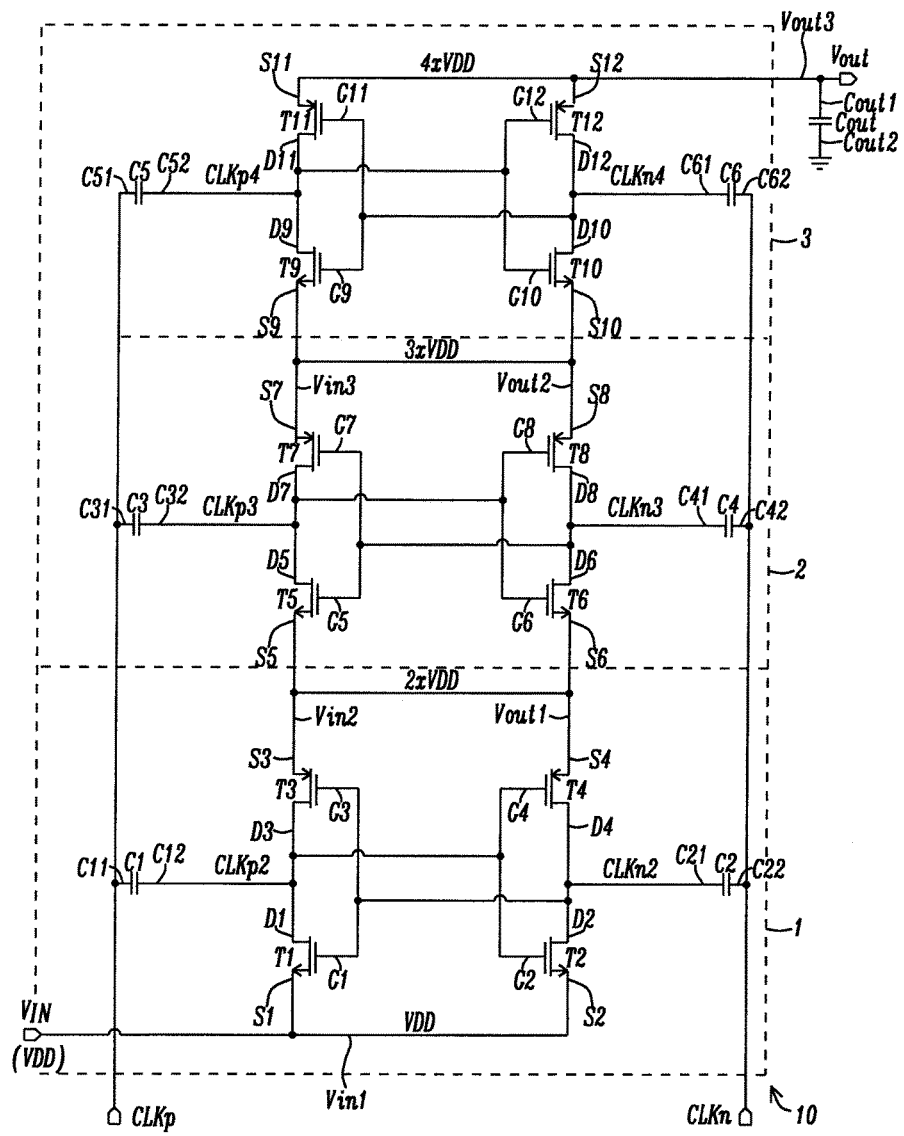
FIG. 1 illustrates a prior art charge pump circuit with voltage doubler circuits.

The main difference of the charge pump circuit 20 of FIG. 2 and the known charge pump circuit 10 in FIG. 1 are the signals connected to the gates of the transistors.

The gates of all the NMOST transistors of the charge pump circuit 20 of FIG. 2 are now connected to a next stage and the gates of all the PMOS transistors are connected to a previous stage. Also two extra capacitors, $C_7$ and $C_8$, and two extra NMOST transistors, $T_{13}$ and $T_{14}$, may be added on top of the circuit to generate the clock signals $CLK_{p5}$ and $CLK_{n5}$. These components can however be very small, since they do not directly pass the load current.

The gates of the NMOST switches of a voltage doubler circuit in one stage are driven by voltage doubler circuits in higher stages. The gates of the PMOS switches of a voltage doubler circuit in one stage are driven by voltage doubler circuits in lower stages.

The charge pump circuit of FIG. 2 may comprise any number of voltage doubler circuits.

The gates of any of the NMOST transistors of a double voltage circuit may be driven by a voltage doubler circuit in any higher stage. For instance, the first NMOST $T_1$ of the first double voltage circuit 21 of the charge pump circuit 20 of FIG. 2 may have its gate terminal $G_1$ connected to the first end $c_{61}$ of capacitor $C_6$ of the third double voltage circuit 23 instead to the first end $c_{41}$ of capacitor $C_4$ of the second double voltage circuit 22 of the charge pump circuit 20 of FIG. 2.

The gates of any of the PMOST transistors of a double voltage circuit may be driven by a voltage doubler circuit in any lower stage. For instance, the eleventh PMOST $T_{11}$ of the third double voltage circuit 23 of the charge pump circuit 20 of FIG. 2 may have its gate terminal $G_{11}$ connected to the first end $c_{21}$ of capacitor $C_2$ of the first double voltage circuit 21 instead to the first end $c_{41}$ of capacitor $C_4$ of the second double voltage circuit 22 of the charge pump circuit 20 of FIG. 2.

The gates of any of the PMOST transistors and/or the gates of any of the NMOST transistors of a double voltage circuit may be driven by a double voltage circuit of the same stage. I.e., some of the gates of the PMOST transistors of a double voltage circuit may be driven by a voltage doubler circuit in a lower stage and some of the gates of the PMOST transistors of a double voltage circuit may be driven by the voltage doubler circuit to which they belong. For instance, the eleventh PMOST $T_{11}$ of the third double voltage circuit 23 of the charge pump circuit 20 of FIG. 2 may have its gate terminal $G_{11}$ connected to the first end $c_{61}$ of capacitor $C_6$ of the third double voltage circuit 23 of the charge pump circuit 20 of FIG. 2.

Any combination of the above described may be possible.

Figure 3:
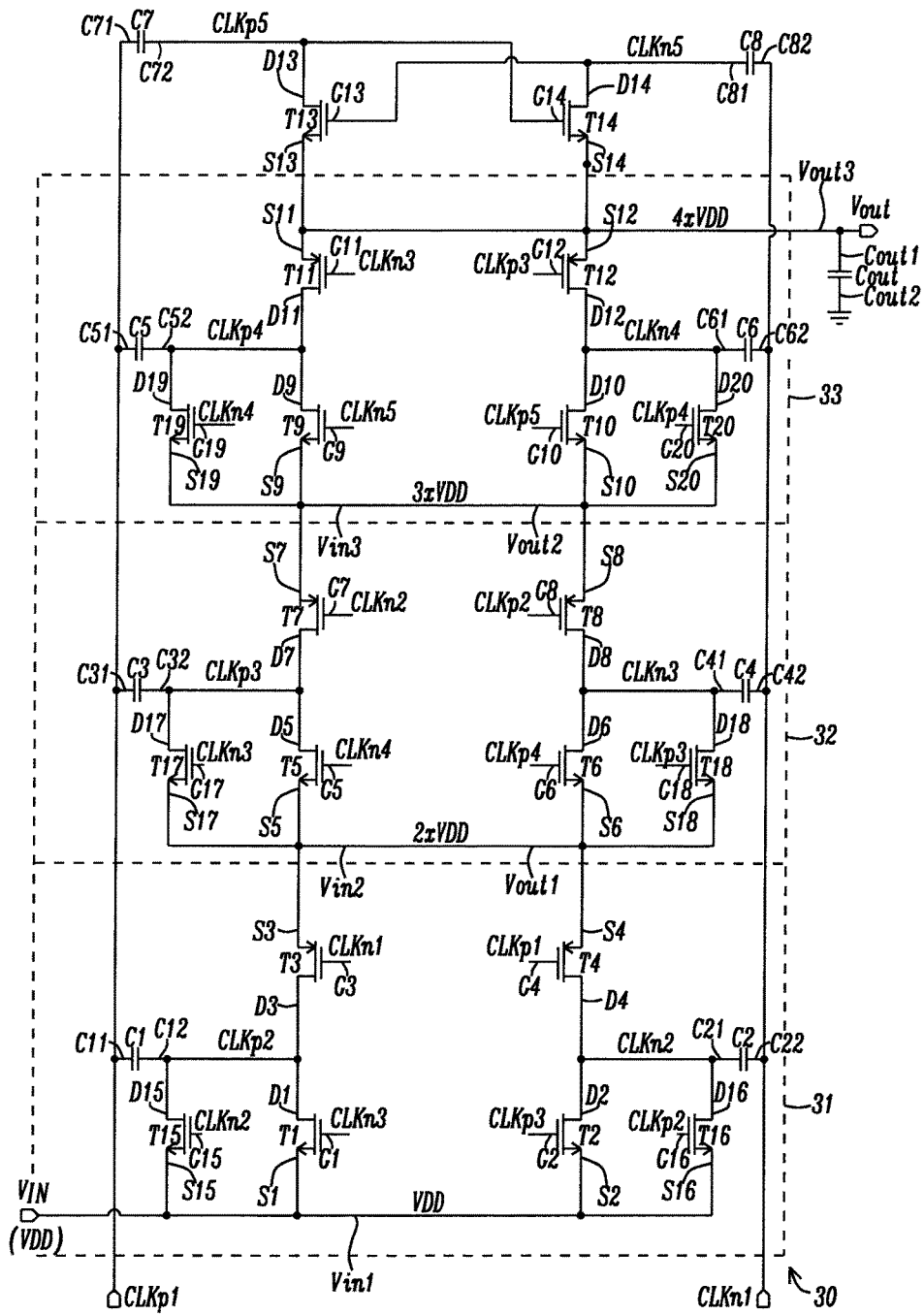
FIG. 3 illustrates the pump charge circuit of FIG. 2 including start up transistors.

FIG. 3 illustrates the pump charge circuit of FIG. 2 including start up transistors.

The pump charge circuit 30 of FIG. 3 comprises all the elements of FIG. 2 connected in the same way.

The first double circuit 31 of the pump charge circuit 30 of FIG. 3 includes the same elements of the first double circuit 21 of the pump charge circuit 20 of FIG. 2 and also includes a fifteenth NMOST $T_{15}$ and a sixteenth NMOST $T_{16}$. The source $S_{15}$ of the fifteenth NMOST $T_{15}$ and the source $S_{16}$ of the sixteenth NMOST $T_{16}$ are connected to the input $V_{in1}$ of the first double voltage circuit 31 of the charge pump circuit 30 of FIG. 3.

The drain $D_{15}$ of the fifteenth NMOST $T_{15}$ is connected to the second end $c_{12}$ of capacitor $C_1$, to the drain $D_1$ of the first NMOST $T_1$ and to the drain $D_3$ of the third PMOST $T_3$.

The drain $D_{16}$ of the sixteenth NMOST $T_{16}$ is connected to the first end $c_{21}$ of capacitor $C_2$, to the drain $D_2$ of the second NMOST $T_2$ and to the drain $D_4$ of the fourth PMOST $T_4$.

The gate $G_{15}$ of the fifteenth NMOST $T_{15}$ is connected to the first end $c_{21}$ of capacitor $C_2$.

The gate $G_{16}$ of the sixteenth NMOST $T_{16}$ is connected to the second end $c_{12}$ of capacitor $C_1$.

The second double circuit 32 of the pump charge circuit 30 of FIG. 3 includes the same elements of the second double circuit 22 of the pump charge circuit 20 of FIG. 2 and also includes a seventeenth NMOST $T_{17}$ and an eighteenth NMOST $T_{18}$. The source $S_{17}$ of the seventeenth NMOST $T_{17}$ and the source $S_{18}$ of the eighteenth NMOST $T_{18}$ are connected to the input $V_{in2}$ of the second double voltage circuit 32 of the charge pump circuit 30 of FIG. 3.

The drain $D_{17}$ of the seventeenth NMOST $T_{17}$ is connected to the second end $c_{32}$ of capacitor $C_3$, to the drain $D_5$ of the fifth NMOST $T_5$ and to the drain $D_7$ of the seventh PMOST $T_7$.

The drain $D_{18}$ of the eighteenth NMOST $T_{18}$ is connected to the first end $c_{41}$ of capacitor $C_4$, to the drain $D_6$ of the sixth NMOST $T_6$ and to the drain $D_8$ of the eighth PMOST $T_8$.

The gate $G_{17}$ of the seventeenth NMOST $T_{17}$ is connected to the first end $c_{41}$ of capacitor $C_4$.

The gate $G_{18}$ of the eighteenth NMOST $T_{18}$ is connected to the second end $c_{32}$ of capacitor $C_3$.

The third double circuit 33 of the pump charge circuit 30 of FIG. 3 includes the same elements of the third double circuit 23 of the pump charge circuit 20 of FIG. 2 and also includes a nineteenth NMOST $T_{19}$ and a twentieth NMOST $T_{20}$. The source $S_{19}$ of the nineteenth NMOST $T_{19}$ and the source $S_{20}$ of the twentieth NMOST $T_{20}$ are connected to the input $V_{in3}$ of the third double voltage circuit 33 the charge pump circuit 30 of FIG. 3.

The drain $D_{19}$ of the nineteenth NMOST $T_{19}$ is connected to the second end $c_{52}$ of capacitor $C_5$, to the drain $D_9$ of the ninth NMOST $T_9$ and to the drain $D_{11}$ of the eleventh PMOST $T_{11}$.

The drain $D_{20}$ of the twentieth NMOST $T_{20}$ is connected to the first end $c_{61}$ of capacitor $C_6$, to the drain $D_{10}$ of the tenth NMOST $T_{10}$ and to the drain $D_{12}$ of the twelfth PMOST $T_{12}$.

The gate $G_{19}$ of the nineteenth NMOST $T_{19}$ is connected to the first end $c_{61}$ of capacitor $C_6$.

The gate $G_{20}$ of the twentieth NMOST $T_{20}$ is connected to the second end $c_{52}$ of capacitor $C_5$.

The transistors added in FIG. 3 compared to FIG. 2 are exactly the same NMOST transistors as in the known charge pump circuit of FIG. 1. They make sure that the capacitors are charged, even if the next-stage is not yet at its intended voltage and the block NMOST transistors are not turned-on properly. This prevents a potential dead-lock situation.

Figure 4:
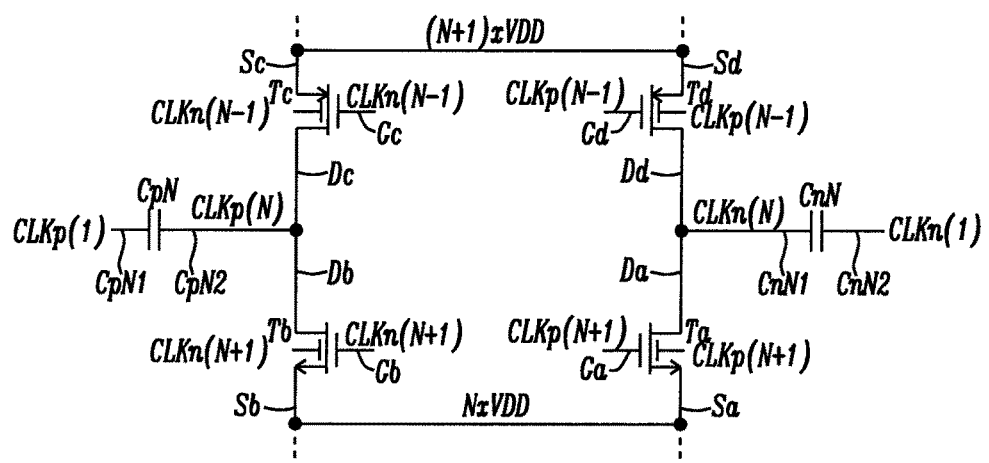
FIG. 4 shows an alternative double voltage circuit.

FIG. 4 illustrates an alternative voltage doubler circuit that may be used in the charge pump circuit of FIG. 2 or FIG. 3. The voltage doubler circuit of FIG. 4 comprises a NMOST $T_a$ having a gate $G_a$, a drain $D_a$ and a source $S_a$, a NMOST $T_b$ having a gate $G_b$, a drain $D_b$ and a source $S_b$, a PMOS $T_c$ having a gate $G_c$, a drain $D_c$ and a source $S_c$, a NMOST $T_d$ having a gate $G_d$, a drain $D_d$ and a source $S_d$, a capacitor $C_{pN}$ having a first end $c_{pN1}$ and a second end $C_{pN2}$, a capacitor $C_{nN}$ having a first end $c_{nN1}$ and a second end $c_{nN2}$, a first clock generator $CLK_{p(1)}$ connected to first end $c_{pN1}$, and a second clock generator $CLK_{n(1)}$ connected to second end $c_{nN2}$. The voltage doubler circuit of FIG. 4 comprises the same elements as any of the voltage doubler elements of the charge pump circuit of FIG. 2. The only difference is that the bulk terminals of the transistors are connected to its gate. The transistors can be turned-on a little harder by also driving the bulk from the clock-signals that drive the gate. The drawback is an increase in area, but this will be compensated by the transistors that can become smaller for a similar on-resistance.

Figure 5:
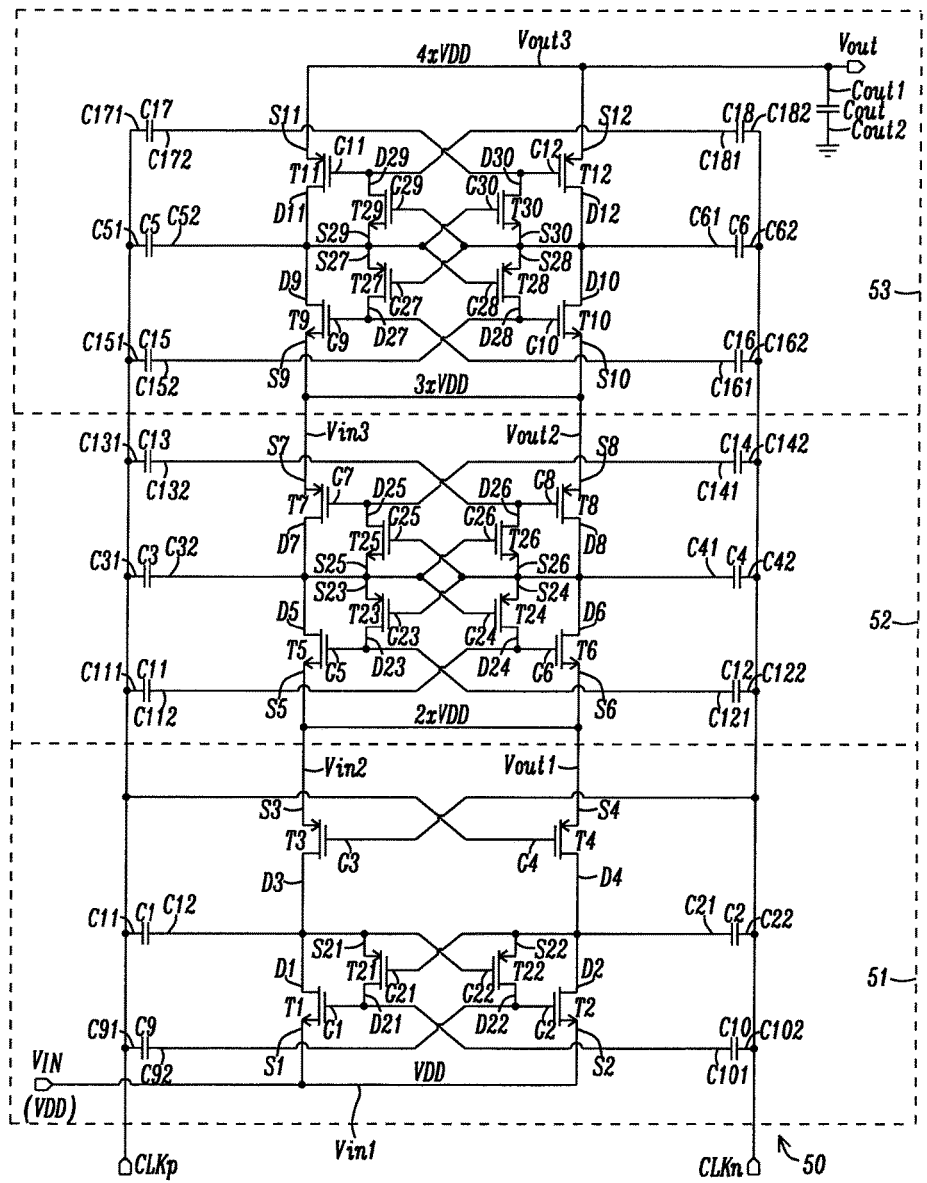
FIG. 5 illustrates a charge pump circuit according to another embodiment of the invention.

FIG. 5 illustrates a charge pump circuit according to another embodiment of the invention.

The charge-pump circuit 50 of FIG. 5, seen from down to up, comprises a series circuit of first voltage doubler circuit 51, a second voltage doubler circuit 52, and a third voltage doubler circuit 53. The charge-pump circuit 50 of FIG. 5 may comprise any number of first voltage doubler circuits.

The charge pump circuit 50 of FIG. 5 comprises a plurality of transistors $T_i$ (i=1, 2 . . . 12, 21 . . . 30). Each one of these transistors $T_i$ has a respective gate $G_i$, a source $S_i$, and a drain $D_i$. For the sake of simplicity, a transistor $T_i$ will be called an $i^{th}$ transistor in the specification hereinafter. The charge pump circuit 50 of FIG. 5 also comprises a plurality of capacitors $C_j$ (j=1, 2 . . . 16). Each one of these capacitors $C_j$ has a first end $c_{j1}$ and a second end $c_{j2}$. It is observed that the reference number concerned may be different in the claims, as they may appear in another order in the claims.

FIG. 5, also shows the voltage received and delivered by each of the voltage doubler circuits: the first voltage doubler circuit 51 is arranged to receive a voltage $V_{in1}$ from the input $V_{in}$ of the charge pump circuit and to deliver a voltage $V_{out1}$ to the second voltage doubler circuit 52, the second voltage doubler circuit 52 is arranged to receive a voltage $V_{in2}$ and to deliver a voltage $V_{out2}$ to the third voltage doubler circuit 53, and the third voltage doubler circuit 53 is arranged to receive a voltage $V_{in3}$ and to deliver a voltage $V_{out3}$ to the output $V_{out}$ of the charge pump circuit 50 of FIG. 5.

The charge pump circuit 50 of FIG. 5 comprises a first clock signal generator $CLK_p$ and a second clock signal generator $CLK_n$. The first clock signal generator $CLK_p$ is configured to generate a first clock signal and the a second clock signal generator $CLK_n$ is configured to generate a second clock signal, wherein the second clock signal is low when the first clock signal is high and the second clock signal is high when the first clock signal is low.

The charge pump circuit 50 of FIG. 5 may comprise a capacitor $C_{out}$ having a first end $c_{out1}$ and a second end $c_{out2}$.

The first end $c_{out1}$ of $C_{out}$ may be connected to the output $V_{out}$ of the charge pump circuit 50 of FIG. 5. The second end $c_{out2}$ of $C_{out}$ may be connected to the ground.

The first voltage doubler circuit 51 of the charge pump circuit 50 of FIG. 5 includes a first NMOST $T_1$, a second NMOST $T_2$, a third PMOST $T_3$, a fourth PMOST $T_4$, a twenty-first PMOST $T_{21}$ and a twenty-second PMOST $T_{22}$. The first voltage doubler circuit 51 of the charge pump circuit 50 of FIG. 5 also includes a first capacitor $C_1$ having a first end $c_{11}$ and a second end $c_{12}$, a second capacitor $C_2$ having a first end $c_{21}$ and a second end $c_{22}$, ninth capacitor $C_9$ having a first end $c_{91}$ and a second end $c_{92}$, and a tenth capacitor $C_{10}$ having a first end $c_{101}$ and a second end $c_{102}$. The first NMOST $T_1$ and the second NMOST $T_2$ have their source terminals $S_1$ and $S_2$ connected to the input $V_{in}$ of the charge pump circuit 50 of FIG. 5 and their drain terminals $D_1$ and $D_2$ connected respectively to the second end $c_{12}$ of capacitor $C_1$ and to the first end $c_{21}$ of capacitor $C_2$. The drain terminal $D_1$ of the first NMOST $T_1$ is also connected to the drain terminal $D_3$ of the third PMOST $T_3$, to the source terminal $S_{21}$ of the twenty-first PMOST $T_{21}$, and to the gate terminal $G_{22}$ of the twenty-second PMOST $T_{22}$. The drain terminal $D_2$ of the second NMOST $T_2$ is also connected to the drain terminal $D_4$ of the fourth PMOST $T_4$, to the source terminal $S_{22}$ of the twenty-second PMOST $T_{22}$, and to the gate terminal $G_{21}$ of the twenty-first PMOST $T_{21}$. The third PMOST $T_3$ and the fourth PMOST $T_4$ have their source terminals $S_3$ and $S_4$ connected to the voltage output $V_{out1}$ of the first double voltage circuit 51.

The first NMOST $T_1$ has its gate terminal $G_1$ connected to the drain terminal $D_{21}$ of the twenty-first PMOST $T_{21}$ and to the first end $c_{101}$ of the capacitor $C_{10}$.

The second NMOST $T_2$ has its gate terminal $G_2$ connected to the drain terminal $D_{22}$ of the twenty-second PMOST $T_{22}$ and to the second end $c_{92}$ of the capacitor $C_9$.

The third PMOST $T_3$ has its gate terminal $G_3$ connected to the second clock signal generator $CLK_n$.

The fourth PMOST $T_4$ has its gate terminal $G_4$ connected to the first clock signal generator $CLK_p$.

The voltage output $V_{out1}$ of the first double voltage circuit 51 of the charge pump circuit 50 of FIG. 5 is connected to the voltage input $V_{in2}$ of the second voltage doubler circuit 52 of the charge pump circuit 50.

The second voltage doubler circuit 52 of the charge pump circuit 50 of FIG. 5 includes a fifth NMOST $T_5$, a sixth NMOST $T_6$, a seventh PMOST $T_7$, an eighth PMOST $T_8$, a twenty-third PMOST $T_{23}$, a twenty-fourth PMOST $T_{24}$, a twenty-fifth NMOST $T_{25}$ and a twenty-sixth NMOST $T_{26}$. The second voltage doubler circuit 52 of the charge pump circuit 50 of FIG. 5 also includes a third capacitor $C_3$ having a first end $c_{31}$ and a second end $c_{32}$, a fourth capacitor $C_4$ having a first end $c_{41}$ and a second end $c_{42}$, an eleventh capacitor $C_{11}$ having a first end $c_{111}$ and a second end $c_{112}$, a twelfth capacitor $C_{12}$ having a first end $c_{121}$ and a second end $c_{122}$, a thirteenth capacitor $C_{13}$ having a first end $c_{131}$ and a second end $c_{132}$, and a fourteenth capacitor $C_{14}$ having a first end $c_{141}$ and a second end $c_{142}$. The fifth NMOST $T_5$ and the sixth NMOST $T_6$ have their source terminals $S_5$ and $S_6$ connected to the input $V_{in2}$ of the second voltage doubler circuit 52 of the charge pump circuit 50 of FIG. 5, and their drain terminals $D_5$ and $D_6$ connected respectively to the second end $c_{32}$ of capacitor $C_3$ and to the first end $c_{41}$ of capacitor $C_4$.

The drain terminal $D_5$ of the fifth NMOST $T_5$ is also connected to the drain terminal $D_7$ of the seventh PMOST $T_7$, to the source terminal $S_{23}$ of the twenty-third PMOST $T_{23}$, to the source terminal $S_{25}$ of the twenty-fifth NMOST $T_{25}$, to the gate terminal $G_{24}$ of the twenty-fourth PMOST $T_{24}$, and to the gate terminal $G_{26}$ of the twenty-sixth NMOST $T_{26}$.

The drain terminal $D_6$ of the sixth NMOST $T_6$ is also connected to the drain terminal $D_8$ of the eighth PMOST $T_8$, to the source terminal $S_{24}$ of the twenty-fourth PMOST $T_{24}$, to the source terminal $S_{26}$ of the twenty-sixth NMOST $T_{26}$, to the gate terminal $G_{23}$ of the twenty-third PMOST $T_{23}$, and to the gate terminal $G_{25}$ of the twenty-fifth NMOST $T_{25}$.

The fifth NMOST $T_5$ has its gate terminal $G_5$ connected to the drain terminal $D_{23}$ of the twenty-third PMOST $T_{23}$ and to the first end $c_{121}$ of the capacitor $C_{12}$.

The sixth NMOST $T_6$ has its gate terminal $G_6$ connected to the drain terminal $D_{24}$ of the twenty-fourth PMOST $T_{24}$ and to the second end $c_{112}$ of the capacitor $C_{11}$.

The seventh PMOST $T_7$ has its gate terminal $G_7$ connected to the drain terminal $D_{25}$ of the twenty-fifth NMOST $T_{25}$ and to the first end $c_{141}$ of the capacitor $C_{14}$.

The eighth PMOST $T_8$ has its gate terminal $G_8$ connected to the drain terminal $D_{26}$ of the twenty-sixth NMOST $T_{26}$ and to the second end $c_{132}$ of the capacitor $C_{13}$.

The seventh PMOST $T_7$ and the eighth PMOST $T_8$ have their source terminals $S_7$ and $S_8$ connected to the output $V_{out2}$ of the second double voltage circuit 52.

The output $V_{out2}$ of the second double voltage circuit 52 of the charge pump circuit 50 of FIG. 5 is connected to the input $V_{in3}$ of the third voltage doubler circuit 53 of the charge pump circuit 50.

The third voltage doubler circuit 53 of the charge pump circuit 50 of FIG. 5 includes a ninth NMOST $T_9$, a tenth NMOST $T_{10}$, a eleventh PMOST $T_{11}$, a twelfth PMOST $T_{12}$, a twenty-seventh PMOST $T_{27}$, a twenty-eighth PMOST $T_{28}$, a twenty-ninth NMOST $T_{29}$ and a thirtieth NMOST $T_{30}$. The third voltage doubler circuit 53 of the charge pump circuit 50 of FIG. 5 also includes a fifth capacitor $C_5$ having a first end $c_{51}$ and a second end $c_{52}$, a sixth capacitor $C_6$ having a first end $c_{61}$ and a second end $c_{62}$, a fifteenth capacitor $C_{15}$ having a first end $c_{151}$ and a second end $c_{152}$, a sixteenth capacitor $C_{16}$ having a first end $c_{161}$ and a second end $c_{162}$, a seventeenth capacitor $C_{17}$ having a first end $c_{171}$ and a second end $c_{172}$, and a eighteenth capacitor $C_{18}$ having a first end $c_{181}$ and a second end $c_{182}$.

The ninth NMOST $T_9$ and the tenth NMOST $T_{10}$ have their source terminals $S_9$ and $S_{10}$ connected to the input $V_{in3}$ of the third voltage doubler circuit 53 of the charge pump circuit 50 of FIG. 5, and their drain terminals $D_9$ and $D_{10}$ connected respectively to the second end $c_{52}$ of capacitor $C_5$ and to the first end $c_{61}$ of capacitor $C_6$.

The drain terminal $D_9$ of the ninth NMOST $T_9$ is also connected to the drain terminal $D_{11}$ of the eleventh PMOST $T_{11}$, to the source terminal $S_{27}$ of the twenty-seventh PMOST $T_{27}$, to the source terminal $S_{29}$ of the twenty-ninth NMOST $T_{29}$, to the gate terminal $G_{28}$ of the twenty-eighth PMOST $T_{28}$, and to the gate terminal $G_{30}$ of the thirtieth NMOST $T_{30}$.

The drain terminal $D_{10}$ of the tenth NMOST $T_{10}$ is also connected to the drain terminal $D_{12}$ of the twelfth PMOST $T_{12}$, to the source terminal $S_{28}$ of the twenty-eighth PMOST $T_{28}$, to the source terminal $S_{30}$ of the thirtieth NMOST $T_{30}$, to the gate terminal $G_{27}$ of the twenty-seventh PMOST $T_{27}$, and to the gate terminal $G_{29}$ of the twenty-ninth NMOST $T_{29}$.

The ninth NMOST $T_9$ has its gate terminal $G_9$ connected to the drain terminal $D_{27}$ of the twenty-seventh PMOST $T_{27}$ and to the first end $c_{161}$ of the capacitor $C_{16}$.

The tenth NMOST $T_{10}$ has its gate terminal $G_{10}$ connected to the drain terminal $D_{28}$ of the twenty-eighth PMOST $T_{28}$ and to the second end $c_{152}$ of the capacitor $C_{15}$.

The eleventh NMOST $T_{11}$ has its gate terminal $G_{11}$ connected to the drain terminal $D_{29}$ of the twenty-ninth NMOST $T_{29}$ and to the first end $c_{181}$ of the capacitor $C_{18}$.

The twelfth NMOST $T_{12}$ has its gate terminal $G_{12}$ connected to the drain terminal $D_{30}$ of the thirtieth NMOST $T_{30}$ and to the second end $c_{172}$ of the capacitor $C_{17}$.

The eleventh PMOST $T_{11}$ and the twelfth PMOST $T_{12}$ have their source terminals $S_{11}$ and $S_{12}$ connected to the output $V_{out3}$ of the third double voltage circuit 53.

The output $V_{out3}$ of the third double voltage circuit 53 of the charge pump circuit 50 of FIG. 5 may be connected to the output $V_{out}$ of the charge pump circuit 50.

The first clock signal generator $CLK_p$ of the charge pump circuit 50 of FIG. 5 is connected to the first end $c_{11}$ of capacitor $C_1$, to the first end $c_{31}$ of capacitor $C_3$, to the first end $c_{51}$ of capacitor $C_5$, to the first end $c_{91}$ of capacitor $C_9$, to the first end $c_{111}$ of capacitor $C_{11}$, to the first end $c_{131}$ of capacitor $C_{13}$, to the first end $c_{151}$ of capacitor $C_{15}$ and to the first end $c_{171}$ of capacitor $C_{17}$. The second clock signal generator $CLK_n$ of the charge pump circuit 50 of FIG. 5 is connected to the second end $c_{22}$ of capacitor $C_2$, to the second end $c_{42}$ of capacitor $C_4$, to the second end $c_{62}$ of capacitor $C_6$, to the second end $c_{102}$ of capacitor $C_{10}$, to the second end $c_{122}$ of capacitor $C_{12}$, to the second end $c_{142}$ of capacitor $C_{14}$, to the second end $c_{162}$ of capacitor $C_{16}$ and to the second end $c_{182}$ of capacitor $C_{18}$.

The drawback of the charge pump circuit in FIG. 2 is that when the charge-pump circuit is not yet properly started (that means $2 \times V_{DD}$ is not yet $2 \times V_{DD}$ but close to $V_{DD}$, and $3 \times V_{DD}$ is not yet $3 \times V_{DD}$ but also close to $V_{DD}$, etc.), the signals driving the gates of the transistors are all toggling between $V_{DD}$ and $(2 \times V_{DD})$. In this situation, the charge-pump circuit of FIG. 2 will behave similar to the known charge pump circuit of FIG. 1.

The same gate voltage driving the switches can be achieved by the charge pump circuit 50 of FIG. 5. The components are added compared to 2 can be small, so the cost is not large.

The big advantage is that the charge pump circuit of FIG. 5 will also improve over the charge pump circuit of FIG. 1, even when the charge-pump circuit is not started.

In the voltage doubler circuit 51, two capacitors and 2 transistors are missing compared to the rest of the voltage doubler circuits of FIG. 5. That is because the signals they were supposed to generate are equal to the input clock-signals, therefore the first clock generator $CLK_{n1}$ and the second clock generator $CLK_{p1}$ can be used directly.

The charge pump circuit of FIG. 5 may comprise any number of voltage doubler circuits.

The gates of any of the NMOST transistors of a double voltage circuit may be driven by a voltage doubler circuit in a higher stage as in FIG. 2

The gates of any of the PMOST transistors of a double voltage circuit may be driven by a voltage doubler circuit in a lower stage as in FIG. 2.

The gates of any of the PMOST transistors and/or gates of any of the NMOST transistors of a double voltage circuit may be driven by a double voltage circuit of the same stage. I.e., some of the gates of the PMOST transistors of a double voltage circuit may be driven by a voltage doubler circuit in a lower stage and some of the gates of the PMOST transistors of a double voltage circuit may be driven by the voltage doubler circuit to which they belong.

Any combination of the voltage doubler circuits described in relation to FIG. 1-5 may be possible.

Figure 6:
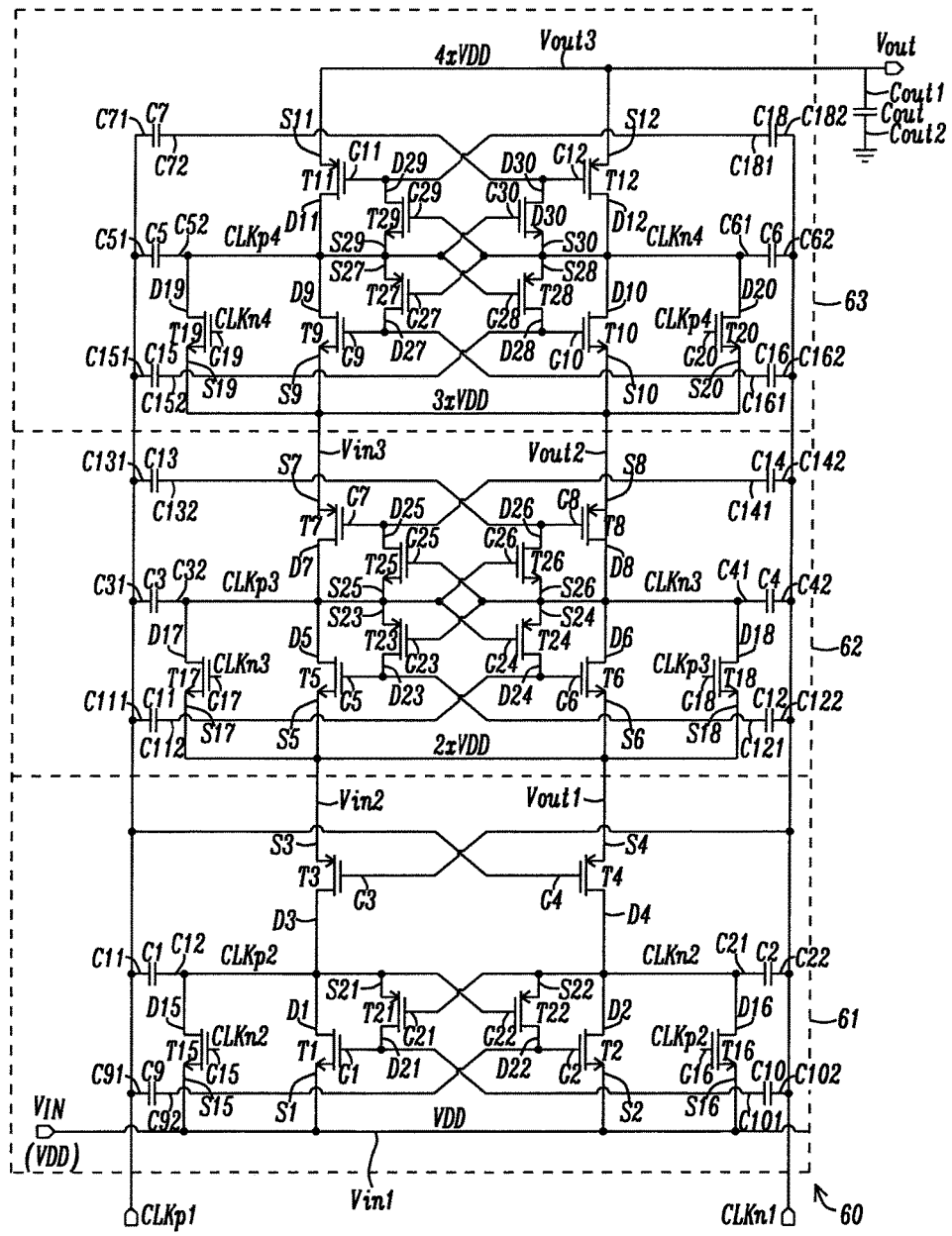
FIG. 6 illustrates the pump charge circuit of FIG. 5 including start up transistors.

FIG. 6 illustrates the pump charge circuit of FIG. 5 including start up transistors.

The pump charge circuit 60 of FIG. 6 comprises all the elements of FIG. 5 connected in the same way.

The first double circuit 61 of the pump charge circuit 60 of FIG. 6 also includes a fifteenth NMOST $T_{15}$ and a sixteenth NMOST $T_{16}$. The source $S_{15}$ of the fifteenth NMOST $T_{15}$ and the source $S_{16}$ of the sixteenth NMOST $T_{16}$ are connected to the input $V_{in1}$ of the first double voltage circuit 61 of the charge pump circuit 60 of FIG. 6.

The drain $D_{15}$ of the fifteenth NMOST $T_{15}$ is connected to the second end $c_{12}$ of capacitor $C_1$, to the drain $D_1$ of the first NMOST $T_1$ and to the drain $D_3$ of the third PMOST $T_3$.

The drain $D_{16}$ of the sixteenth NMOST $T_{16}$ is connected to the first end $c_{21}$ of capacitor $C_2$, to the drain $D_2$ of the second NMOST $T_2$ and to the drain $D_4$ of the fourth PMOST $T_4$.

The gate $G_{16}$ of the sixteenth NMOST $T_{16}$ is connected to the second end $c_{12}$ of capacitor $C_1$.

The gate $G_{15}$ of the fifteenth NMOST $T_{15}$ is connected to the first end $c_{21}$ of capacitor $C_2$.

The second double circuit 62 of the pump charge circuit 60 of FIG. 6 also includes a seventeenth NMOST $T_{17}$ and an eighteenth NMOST $T_{18}$. The source $S_{17}$ of the seventeenth NMOST $T_{17}$ and the source $S_{18}$ of the eighteenth NMOST $T_{18}$ are connected to the input $V_{in2}$ of the second double voltage circuit 62 of the charge pump circuit 60 of FIG. 6.

The drain $D_{17}$ of the seventeenth NMOST $T_{17}$ is connected to the second end $c_{32}$ of capacitor $C_3$, to the drain $D_5$ of the fifth NMOST $T_5$ and to the drain $D_7$ of the seventh PMOST $T_7$.

The drain $D_{18}$ of the eighteenth NMOST $T_{18}$ is connected to the first end $c_{41}$ of capacitor $C_4$, to the drain $D_6$ of the sixth NMOST $T_6$ and to the drain $D_8$ of the eighth PMOST $T_8$.

The gate $G_{17}$ of the seventeenth NMOST $T_{17}$ is connected to the first end $c_{41}$ of capacitor $C_4$.

The gate $G_{18}$ of the eighteenth NMOST $T_{18}$ is connected to the second end $c_{32}$ of capacitor $C_3$.

The third double circuit 63 of the pump charge circuit 60 of FIG. 6 also includes a nineteenth NMOST $T_{19}$ and a twentieth NMOST $T_{20}$. The source $S_{19}$ of the nineteenth NMOST $T_{19}$ and the source $S_{20}$ of the twentieth NMOST $T_{20}$ are connected to the input $V_{in3}$ of the third double voltage circuit 63 of the charge pump circuit 60 of FIG. 6.

The drain $D_{19}$ of the nineteenth NMOST $T_{19}$ is connected to the second end $c_{52}$ of capacitor $C_5$, to the drain $D_9$ of the ninth NMOST $T_9$ and to the drain $D_{11}$ of the eleventh PMOST $T_{11}$.

The drain $D_{20}$ of the twentieth NMOST $T_{20}$ is connected to the first end $c_{61}$ of capacitor $C_6$, to the drain $D_{10}$ of the tenth NMOST $T_{10}$ and to the drain $D_{12}$ of the twelfth PMOST $T_{12}$.

The gate $G_{19}$ of the nineteenth NMOST $T_{19}$ is connected to the first end $c_{61}$ of capacitor $C_6$.

The gate $G_{20}$ of the twentieth NMOST $T_{20}$ is connected to the second end $c_{52}$ of capacitor $C_5$.

Any combination of the voltage doubler circuits described in relation to FIG. 1-6 may be possible.

Figure 7:
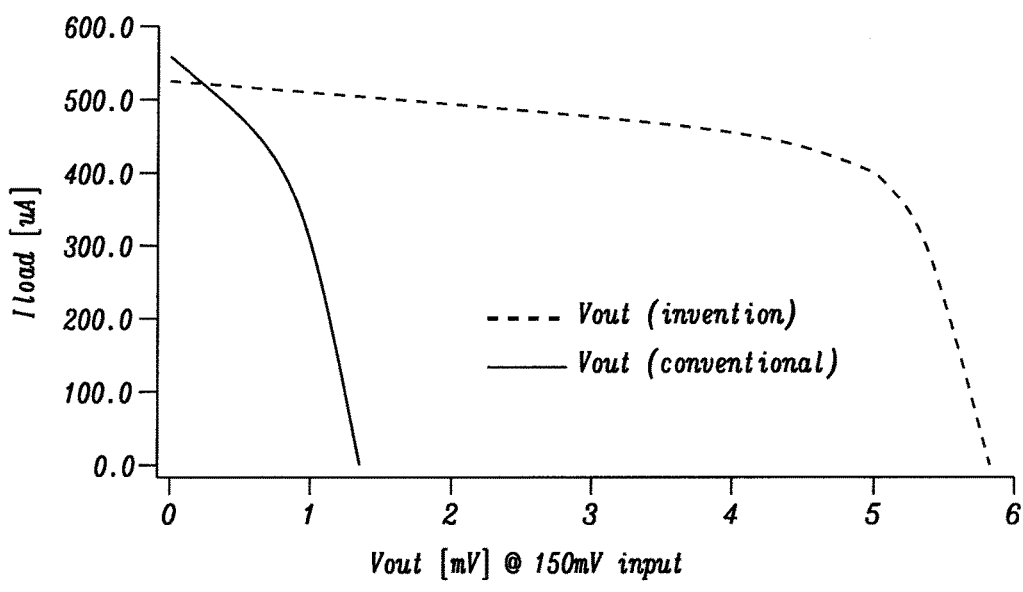
FIG. 7 shows simulation results comparing the charge pump circuit of FIG. 1 and the charge pump circuit of FIG. 2.

FIG. 7 shows simulation results comparing the charge pump circuit of FIG. 1 and the charge pump circuit of FIG. 2. The horizontal axe shows the output voltage $V_{out}$ in millivolts. The vertical axe shows the load current in microampere. The bulk of each transistor is connected to its gate. The input voltage $V_{in}$ is 0.15 volts.

As can be seen, the charge pump circuit of FIG. 2 can deliver significantly more current than the charge pump circuit of FIG. 1.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The present invention is not limited to the disclosed embodiments but comprises any combination of the disclosed embodiments that can come to an advantage. The invention is limited by the attached claims and their technical equivalents only.

Variations to the disclosed embodiments can be understood and effected by a person skilled in the art in practicing the claimed invention, from a study of the figures, the description and the attached claims. In the description and claims, the word "comprising" does not exclude other elements, and the indefinite article "a" or "an" does not exclude a plurality. In fact it is to be construed as meaning "at least one". The mere fact that certain features are recited in mutually different dependent claims does not indicate that a combination of these features cannot be used to advantage. Any reference signs in the claims should not be construed as limiting the scope of the invention.

What is claimed is:

1. A charge pump circuit comprising:
   a number n of voltage doubler circuits, with n>1;
   a first clock signal generator configured to generate a first clock signal;
   a second clock signal generator configured to generate a second clock signal, wherein the second clock signal is low when the first clock signal is high and the second clock signal is high when the first clock signal is low;
   wherein each one of the n voltage doubler circuits comprises:
   an input;
   an output;
   a first capacitor having a first and a second terminal, wherein the first terminal is connected to the first clock signal generator;
   a second capacitor having a first and a second terminal, wherein the first terminal is connected to the second clock signal generator;
   a first N-type metal oxide semiconductor transistor (NMOST) having a source, a drain and a gate, wherein the source of the first NMOST is connected to the input of the voltage doubler circuit and the drain of the first NMOST is connected to the second terminal of the first capacitor;
   a second N-type metal oxide semiconductor transistor (NMOST) having a source, a drain and a gate, wherein the source of the second NMOST is connected to the source of the first NMOST and the drain of the second NMOST is connected to the second terminal of the second capacitor;
   a first P-type metal oxide semiconductor transistor (PMOST) having a source, a drain and a gate, wherein the drain of the first PMOST is connected to the second terminal of the first capacitor and the source of the first PMOST is connected to the output of the voltage doubler circuit;
   a second P-type metal oxide semiconductor transistor (PMOST) having a source, a drain and a gate, wherein the source of the second PMOST is connected to the source of the first PMOST and the drain of the second PMOST is connected to the second terminal of the second capacitor;
   wherein the output of the i-th voltage doubler circuit is the input of the (i+1)-th voltage doubler circuit for every i from 1 to n−1;
   wherein at least a k-th voltage doubler circuit of the n voltage doubler circuits has:
   the gate of the first PMOST connected to the second terminal of the second capacitor of an l-th voltage doubler circuit and/or the gate of the second PMOST connected to the second terminal of the first capacitor of an m-th voltage doubler circuit, wherein l<k and m<k;
   and/or the gate of the first NMOST connected to the second terminal of the second capacitor of a d-th voltage doubler circuit and/or the gate of the second NMOST connected to the second terminal of the first capacitor of a j-th voltage doubler circuit, wherein d>k and j>k.

2. The charge pump circuit of claim 1, further comprising an (n+1)-th stage, wherein the (n+1)-th stage comprises:
   a first capacitor having a first and a second terminal, wherein the first terminal of the first capacitor is connected to the first clock signal generator;
   a second capacitor having a first and a second terminal, wherein the first terminal of the second capacitor is connected to the second clock signal generator;
   a first N-type metal oxide semiconductor transistor (NMOST) having a source, a drain and a gate, wherein the source of the first NMOST is connected to the output of the n-th voltage doubler, the drain of the first NMOST is connected to the second terminal of the first capacitor and the gate of the first NMOST is connected to the second terminal of the second capacitor;
   a second N-type metal oxide semiconductor transistor (NMOST) having a source, a drain and a gate, wherein the source of the second NMOST is connected to the output of the n-th voltage doubler, the drain of the second NMOST is connected to the second terminal of the second capacitor, and the gate of the second NMOST is connected to the second terminal of the first capacitor.

3. A voltage doubler circuit comprising:
   an input;
   an output;
   a first capacitor having a first and a second terminal, wherein the first terminal is configured to receive a first clock signal;
   a second capacitor having a first and a second terminal, wherein the first terminal is configured to receive a second clock signal and wherein the second clock signal is low when the first clock signal is high and the second clock signal is high when the first clock signal is low;
   a first N-type metal oxide semiconductor transistor (NMOST) having a source, a drain and a gate, wherein the source of the first NMOST is connected the input of the voltage doubler circuit and the drain of the first NMOST is connected to the second terminal of the first capacitor;
   a second N-type metal oxide semiconductor transistor (NMOST) having a source, a drain and a gate, wherein the source of the second NMOST is connected to the source of the first NMOST and the drain of the second NMOST is connected to the second terminal of the second capacitor;

a first P-type metal oxide semiconductor transistor (PMOST) having a source, a drain and a gate, wherein the drain of the first PMOST is connected to the second terminal of the first capacitor and the source of the first PMOST is connected to the output of the voltage doubler circuit; and a second P-type metal oxide semiconductor (PMOST) having a source, a drain and a gate, wherein the source of the second PMOST is connected to the source of the first PMOST and the drain of the second PMOST is connected to the second terminal of the second capacitor;

wherein the voltage doubler circuit further comprises:
a third capacitor having a first terminal configured to receive the first clock signal and a second terminal connected to the gate of the second NMOST,
a fourth capacitor having a first terminal configured to receive the second clock signal and a second terminal connected to the gate of the first NMOST,
a third P-type metal oxide semiconductor transistor (PMOST) having a source, a drain and a gate, wherein the source of the third PMOST is connected to the second terminal of the first capacitor, the drain of the third PMOST is connected to the second terminal of the fourth capacitor, and the gate of the third PMOST is connected to the second terminal of the second capacitor, and
a fourth P-type metal oxide semiconductor transistor (PMOST) having a source, a drain and a gate, wherein the source of the fourth PMOST is connected to the second terminal of the second capacitor, the drain of the fourth PMOST is connected to the second terminal of the third capacitor, and the gate of the fourth PMOST is connected to the second terminal of the first capacitor; and/or
fifth capacitor having a first terminal configured to receive the first clock signal and a second terminal connected to the gate of the second PMOST, a sixth capacitor having a first terminal configured to receive the second clock signal and a second terminal connected to the gate of the first PMOST, a third N-type metal oxide semiconductor transistor (NMOST) having a source, a drain and a gate, wherein the source of the third NMOST is connected to the second terminal of the first capacitor, the drain of the third NMOST is connected to the second terminal of the sixth capacitor, and the gate of the third NMOST is connected to the second terminal of the second capacitor, a fourth N-type metal oxide semiconductor transistor (NMOST) having a source, a drain and a gate, wherein the source of the fourth NMOST is connected to the second terminal of the second capacitor, the drain of the fourth NMOST is connected to the second terminal of the fifth capacitor, and the gate of the fourth NMOST is connected to the second terminal of the first capacitor.

4. The charge pump circuit according to claim 1, or the voltage doubler circuit according to claim 3, wherein at least the k-th voltage doubler circuit of the n voltage doubler circuits of the charge pump circuit according to claim 1 or the voltage doubler circuit according to claim 3 further comprises a first start-up N-type metal oxide semiconductor transistor (NMOST) having a source, a drain and a gate, wherein the source is connected to the source of the first NMOST, the drain is connected to the drain of the first NMOST, and the gate is connected to the drain of the second NMOST.

5. The charge pump circuit according to claim 1, or the voltage doubler circuit according to claim 3, wherein at least the k-th voltage doubler circuit of the n voltage doubler circuits of the charge pump circuit according to claim 1 or the voltage doubler circuit according to claim 2 further comprises a second start-up N-type metal oxide semiconductor transistor (NMOST) having a source, a drain and a gate, wherein the source is connected to the source of the second NMOST, the drain is connected to the drain of the second NMOST, and the gate is connected to the drain of the first NMOST.

6. The charge pump circuit according to claim 1, or the voltage doubler circuit according to claim 3, wherein at least one of the MOSTs has a bulk terminal connected to its gate.

7. A method of operating a charge pump circuit comprising the steps of:
providing a number n of voltage doubler circuits, with n>1;
providing a first clock signal generator to generate a first clock signal;
providing a second clock signal generator to generate a second clock signal, wherein the second clock signal is low when the first clock signal is high and the second clock signal is high when the first clock signal is low;
wherein each one of the n voltage doubler circuits comprises:
an input;
an output;
a first capacitor having a first and a second terminal, wherein the first terminal is connected to the first clock signal generator;
a second capacitor having a first and a second terminal, wherein the first terminal is connected to the second clock signal generator;
a first N-type metal oxide semiconductor transistor (NMOST) having a source, a drain and a gate, wherein the source of the first NMOST is connected to the input of the voltage doubler circuit and the drain of the first NMOST is connected to the second terminal of the first capacitor;
a second N-type metal oxide semiconductor transistor (NMOST) having a source, a drain and a gate, wherein the source of the second NMOST is connected to the source of the first NMOST and the drain of the second NMOST is connected to the second terminal of the second capacitor;
a first P-type metal oxide semiconductor transistor (PMOST) having a source, a drain and a gate, wherein the drain of the first PMOST is connected to the second terminal of the first capacitor and the source of the first PMOST is connected to the output of the voltage doubler circuit;
a second P-type metal oxide semiconductor transistor (PMOST) having a source, a drain and a gate, wherein the source of the second PMOST is connected to the source of the first PMOST and the drain of the second PMOST is connected to the second terminal of the second capacitor;
wherein the output of the i-th voltage doubler circuit is the input of the (i+1)-th voltage doubler circuit for every i from 1 to n−1;
wherein at least a k-th voltage doubler circuit of the n voltage doubler circuits has:

the gate of the first PMOST connected to the second terminal of the second capacitor of an l-th voltage doubler circuit and/or the gate of the second PMOST connected to the second terminal of the first capacitor of an m-th voltage doubler circuit, wherein l<k and m<k;

and/or the gate of the first NMOST connected to the second terminal of the second capacitor of a d-th voltage doubler circuit and/or the gate of the second NMOST connected to the second terminal of the first capacitor of a j-th voltage doubler circuit, wherein d>k and j>k and providing an input voltage $V_{in}$ to the input;

wherein if the first clock signal is low then the first NMOST and the second PMOST are conducting, the second NMOST and the first PMOST are in cut-off, and the first and second capacitors are charging;

wherein if the first clock signal is high then the first NMOST and the second PMOST are in cut-off, the second NMOST and the first PMOST are conducting, and the first and second capacitors are discharging;

and wherein the output provides an output voltage $V_{out}$ which is larger than the input voltage $V_{in}$.

8. The method of operating a charge pump circuit of claim 7, further comprising an (n+1)-th stage, wherein the (n+1)-th stage comprises:

a first capacitor having a first and a second terminal, wherein the first terminal of the first capacitor is connected to the first clock signal generator;

a second capacitor having a first and a second terminal, wherein the first terminal of the second capacitor is connected to the second clock signal generator;

a first N-type metal oxide semiconductor transistor (NMOST) having a source, a drain and a gate, wherein the source of the first NMOST is connected to the output of the n-th voltage doubler, the drain of the first NMOST is connected to the second terminal of the first capacitor and the gate of the first NMOST is connected to the second terminal of the second capacitor;

a second N-type metal oxide semiconductor transistor (NMOST) having a source, a drain and a gate, wherein the source of the second NMOST is connected to the output of the n-th voltage doubler, the drain of the second NMOST is connected to the second terminal of the second capacitor, and the gate of the second NMOST is connected to the second terminal of the first capacitor.

9. The method of operating the charge pump circuit according to claim 7, wherein at least the k-th voltage doubler circuit of the n voltage doubler circuits of the charge pump circuit or the voltage doubler circuit further comprises a first start-up N-type metal oxide semiconductor transistor (NMOST) having a source, a drain and a gate, wherein the source is connected to the source of the first NMOST, the drain is connected to the drain of the first NMOST, and the gate is connected to the drain of the second NMOST.

10. The method of operating the charge pump circuit according to claim 7, wherein at least the k-th voltage doubler circuit of the n voltage doubler circuits of the charge pump circuit or the voltage doubler circuit further comprises a second start-up N-type metal oxide semiconductor transistor (NMOST) having a source, a drain and a gate, wherein the source is connected to the source of the second NMOST, the drain is connected to the drain of the second NMOST, and the gate is connected to the drain of the first NMOST.

11. The method of operating the charge pump circuit according to claim 7, wherein at least one of the MOSTs has a bulk terminal connected to its gate.

* * * * *